(12) United States Patent
Mahdi et al.

(10) Patent No.: US 6,828,403 B2
(45) Date of Patent: Dec. 7, 2004

(54) METHOD OF BONDING A WINDOW TO A SUBSTRATE USING A SILANE FUNCTIONAL ADHESIVE COMPOSITION

(75) Inventors: Syed Z. Mahdi, Rochester Hills, MI (US); Harry W. Hsieh, Troy, MI (US)

(73) Assignee: Essex Specialty Products, Inc., Auburn Hills, MI (US)

( * ) Notice: Subject to any disclaimer, the term of this patent is extended or adjusted under 35 U.S.C. 154(b) by 206 days.

(21) Appl. No.: 10/035,894

(22) Filed: Nov. 9, 2001

(65) Prior Publication Data

US 2002/0100550 A1 Aug. 1, 2002

Related U.S. Application Data

(63) Continuation-in-part of application No. 09/300,340, filed on Apr. 27, 1999, now abandoned.
(60) Provisional application No. 60/083,125, filed on Apr. 27, 1998.

(51) Int. Cl.[7] .............................................. C08G 18/30
(52) U.S. Cl. ......................... 528/18; 525/403; 525/452
(58) Field of Search ......................... 528/18; 525/403, 525/452

(56) References Cited

U.S. PATENT DOCUMENTS

| | | | |
|---|---|---|---|
| 3,971,751 A | 7/1976 | Isayama et al. | 260/37 |
| 4,222,925 A | 9/1980 | Bryant et al. | 260/37 |
| 4,302,571 A | 11/1981 | Arai et al. | 528/32 |
| 4,345,053 A | 8/1982 | Rizk et al. | 525/440 |
| 4,367,313 A | 1/1983 | Rizk et al. | 525/102 |
| 4,396,681 A | 8/1983 | Rizk et al. | 428/423.1 |
| 4,399,261 A | 8/1983 | Kato et al. | 525/342 |
| 4,444,974 A | 4/1984 | Takase et al. | 528/33 |
| 4,474,933 A | 10/1984 | Huber et al. | 528/26 |
| 4,507,469 A | 3/1985 | Mita et al. | 528/425 |
| 4,571,278 A | 2/1986 | Kunert | 156/108 |
| 4,622,369 A | 11/1986 | Chang et al. | 525/440 |
| 4,625,012 A | 11/1986 | Rizk et al. | 528/28 |
| 4,645,816 A | 2/1987 | Pohl et al. | 528/28 |
| 4,758,648 A | 7/1988 | Rizk et al. | 528/53 |
| 4,788,170 A | 11/1988 | Wengrovius | 502/152 |
| 4,837,401 A | 6/1989 | Hirose et al. | 525/364 |
| 4,889,903 A | 12/1989 | Baghdachi | 528/17 |
| 4,965,311 A | 10/1990 | Hirose et al. | 524/483 |
| 5,063,270 A | 11/1991 | Yukimoto et al. | 524/306 |
| 5,068,304 A | 11/1991 | Higuchi et al. | 528/28 |
| 5,194,460 A | 3/1993 | Evans et al. | 523/211 |
| 5,272,224 A | 12/1993 | Baghdachi et al. | 525/460 |
| 5,330,597 A | 7/1994 | Leuchten et al. | 156/108 |
| 5,342,914 A | 8/1994 | Iwakiri et al. | 528/32 |
| 5,403,881 A | 4/1995 | Okawa et al. | 524/261 |
| 5,464,888 A | * 11/1995 | Owen | |
| 5,539,045 A | 7/1996 | Potts et al. | 524/588 |
| 5,554,709 A | 9/1996 | Emmerling et al. | 528/27 |
| 5,741,383 A | 4/1998 | Kneisel | 156/108 |
| 5,866,651 A | * 2/1999 | Moren et al. | |
| 6,025,416 A | 2/2000 | Proebster et al. | 523/333 |

FOREIGN PATENT DOCUMENTS

| | | | |
|---|---|---|---|
| EP | 0 070 475 A2 | 1/1983 | C08G/18/71 |
| EP | 0 363 006 A2 | 4/1990 | C08J/3/24 |
| EP | 0 532 048 A1 | 3/1993 | C08G/65/32 |
| EP | 0 538 880 A2 | 4/1993 | C08G/65/32 |
| EP | 0 546 310 A2 | 6/1993 | C08G/65/32 |
| EP | 0 525 769 A1 | 7/1993 | C08G/65/32 |
| EP | 0 819 749 A2 | 1/1998 | C09J/201/10 |
| JP | 2-36260 | 2/1990 | C08L/71/02 |
| WO | 94/18255 | 8/1994 | C08J/18/10 |

* cited by examiner

Primary Examiner—Rachel Gorr

(57) ABSTRACT

The invention is an adhesive composition comprising
a) i) a trialkoxysilane functional polyether or polyurethane wherein the polyether or polyurethane has a weight average molecular weight of 6000 or greater and a dialkyltin carboxylate or dialkyltin alcoholate; or
ii) a dialkoxysilane functional polyether or polyurethane and a dialkyltin alcoholate; and
b) a primary or secondary amino straight chain alkyl trialkoxysilane;
wherein the dialkyltin carboxylate or dialkyltin alcoholate is present in an effective amount to facilitate bonding of the adhesive to a substrate of from about 0.1 to about 1.0 percent by weight based on the weight of the adhesive and the primary or secondary amino straight chained alkyl trialkoxysilane is present in an amount which is effective to facilitate bonding of the adhesive to a substrate wherein the amount is from about 0.5 to about 1.2 percent by weight.

18 Claims, No Drawings

METHOD OF BONDING A WINDOW TO A SUBSTRATE USING A SILANE FUNCTIONAL ADHESIVE COMPOSITION

CROSS-REFERENCE TO RELATED APPLICATION

This application is a continuation-in-part of application Ser. No. 09/300,340 filed Apr. 27, 1999 now abandoned (incorporated herein by reference). This application claims the benefit of U.S. Provisional Application No. 60/083,125 filed on Apr. 27, 1998 (incorporated herein reference).

BACKGROUND OF THE INVENTION

This invention relates to an adhesive composition useful for bonding glass to a substrate and a method of bonding a window to a substrate using a silane functional adhesive composition which is capable of being used without the need for a primer.

Polyurethane sealant compositions typically are used for bonding non-porous substrates, such as glass, to nonporous substrates, these are described in U.S. Pat. No. 4,374,237 and U.S. Pat. No. 4,687,533, both incorporated herein by reference. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups. EP 856,569 discloses the use of polyoxyalkylene polymer terminated with silanes having hydrolyzable groups bonded thereto blended with apolyoxyalkylene polymer having no cross-linking groups can be used for to bond glass to metal. This adhesives have not been a commercial success.

However, when such sealants are used to bond glass substrates to painted substrates, such as for window installation in vehicle manufacturing, the lap shear strength of the bonded substrate may be less than desirable for safety or structural purposes. Consequently, a separate paint primer comprising a solution of one or more silanes is typically applied to a painted substrate prior to the application of the sealant in most vehicle assembly operations for bonding the windshield and the rear window. Further a separate primer is also applied to the ceramic frit coated on the edge of the window (glass primer). The use of primers in assembly operations is undesirable in that it introduces extra steps, additional cost, the risk of marring the paint surface if dripped on an undesired location and exposes the assembly line operators to additional chemicals. It would be desirable to provide a sealant which, when bonded to a painted substrate and glass then cured, provides a bond with a higher lap shear strength, particularly when used in the absence of a paint primer and/or a glass primer.

SUMMARY OF THE INVENTION

The invention is an adhesive composition comprising
a) i) a trialkoxysilane functional polyether or polyurethane wherein the polyether or polyurethane has a weight average molecular weight of 6000 or greater and a dialkyltin carboxylate or dialkyltin alcoholate; or
ii) a dialkoxysilane functional polyether or polyurethane and a dialkyltin alcoholate; and
b) a primary or secondary amino straight chain alkyl trialkoxysilane;
wherein the dialkyltin carboxylate or dialkyltin alcoholate is present in an effective amount to facilitate bonding of the adhesive to a substrate of from about 0.1 to about 1.0 percent by weight based on the weight of the adhesive and the primary or secondary amino straight chained alkyl trialkoxysilane is present in an amount which is effective to facilitate bonding of the adhesive to a substrate wherein the amount is from about 0.5 to about 1.5 percent by weight.

In another embodiment, the invention is a method of bonding a window in a vehicle. The process comprises applying to a window or a window frame of a structure an adhesive according to the invention; contacting the window with the window frame of a substrate wherein the adhesive is located between the window and the substrate; and allowing the adhesive to cure. This process is especially useful when the substrate is unprimed metal, plastic, fiberglass or a composite, optionally coated with a coating. In another embodiment it is useful when the window is unprimed.

The method of the invention allows the bonding of a window into a substrate without the need for priming the surface of the substrate and/or the surface of the window to which it is bonded. This is especially useful for bonding windows into automobiles.

DETAILED DESCRIPTION OF THE INVENTION

The adhesive composition of the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins and the like. Among more preferred polymer backbones are the polyethers and polyurethanes, with the most preferred being the polyethers.

Even more preferably the polymer is a polyether having silane moieties capable of silanol condensation. In one embodiment, the polymer useful in the invention is a polymer as disclosed in Yukimoto et al., U.S. Pat. No. 4,906,707; Iwakiri et al., U.S. Pat. No. 5,342,914; Yukimoto U.S. Pat. No. 5,063,270; Yukimoto et al. U.S. Pat. No. 5,011,900; Suzuki et al. U.S. Pat. No. 5,650,467, all incorporated herein by reference. More preferably such polymers are oxyalkylene polymers containing at least one reactive silicon group per molecule. The oxyalkylene polymer which can be used in the present invention includes polymers having a molecular chain represented by formula (1):

$$—(R—O)_n— \quad (1)$$

wherein R represents a divalent alkylene group having 2 to 4 carbon atoms, and preferably 2 to 3 carbon atoms; and n represents the number of repeating units. The oxyalkylene polymer may have a straight chain or a branched structure, or a mixed structure thereof. From the viewpoint of availability an oxyalkylene polymer having a repeating unit represented by formula (2) is preferred:

$$—CH(CH_3)CH_2O— \quad (2)$$

The polymer may contain other monomer units but preferably comprises the monomer unit of formula (1) in a proportion of at least about 50 percent by weight, particularly about 80 percent by weight or more. Oxyalkylene polymers having a number average molecular weight (Mn) of about 3,000 or more are preferred. Those having a Mn of about 3,000 to about 50,000 are even more preferred, and about 3,000 to about 30,000, are most preferred. Preferably the ratio (Mw/Mn) of weight average molecular weight (Mw) to number average molecular weight (Mn) is not higher than about 1.6, which indicates that the polymer has an extremely narrow molecular weight distribution (i.e., it is highly monodisperse). The Mw/Mn ratio is more preferably not higher than about 1.5, and most preferably not higher than about 1.4. While molecular weight distribution is measurable by various methods, it is generally measured by gel-permeation chromatography (GPC).

The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. While not limited thereto, typical reactive silicon groups are represented by formula (3):

(3)

wherein $R^1$ and $R^2$ each represent an alkyl group having 1 to 20 carbon atoms, an aryl group having 6 to 20 carbon atoms, an aralkyl group having 7 to 20 carbon atoms or a triorganosiloxy group represented by $(R')_3SiO$—, wherein each of the three R' groups, which may be the same or different represents a monovalent hydrocarbon group having 1 to 20 carbon atoms; when there are two or more of each of the $R^1$ or $R^2$ groups, each of the $R^1$ and $R^2$ groups may be the same or different, and the $R^1$ can be the same or different from $R^2$; X is independently in each occurrence a hydroxyl group or a hydrolyzable group; when there are two or more X groups; a is independently in each occurrence 0, 1, 2 or 3; and b is independently in each occurrence 0, 1 or 2; and m represents 0 or an integer of from 1 to 19; wherein a and b are chosen to satisfy the relationship $a+\Sigma b \geq 1$.

The hydrolyzable group represented by X is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group an acyloxy group, a ketoximate group, an amino group, an amido group, an amino-oxygroup, a mercapto group, and an alkenyloxy group. An alkoxy group, is more preferred with a methoxy or ethoxy group being most preferred, for ease in handling due to its mild hydrolyzablility. One to three hydroxyl groups or hydrolyzable groups may be bonded to one silicon atom, and $(a+\Sigma b)$ is preferably 1 to 5. Where two or more hydroxyl groups or hydrolyzable groups are present per reactive silicon group, they may be the same or different. The reactive silicon group may have one or more silicon atoms. A reactive silicon group in which silicon atoms are linked to form siloxane bondings may have as much as 20 silicon atoms. From the standpoint of availability, reactive silicon groups represented by formula (4) shown below are preferred:

(4)

wherein $R^1$, X, and α are as defined above $R^1$ is preferably an alkyl group, e.g., methyl or ethyl; a cycloalkyl group, e.g., cyclohexyl; an aryl group, e.g., phenyl; an aralkyl group, e.g., benzyl; or a triogansiloxy group of formula $(R')_3SiO$— in which R' is methyl or phenyl. $R^1$ and R' are most preferably a methyl group.

The oxyalkylene polymer contains at least one, and preferably about 1.1 to about 6 reactive silicon groups per molecule. If the number of the reactive silicon group per molecule is less than 1, the polymer has insufficient curability, failing to achieve satisfactory rubbery elasticity. The reactive silicon group may be placed either at the terminal or in the inside of the molecular chain of the oxyalkylene polymer. An oxyalkylene polymer having the reactive silicon group at the molecular terminal thereof tends to provide a rubbery cured product having high tensile strength and high elongation.

The oxyalkylene polymer having a reactive silicon group is preferably obtained by introducing a reactive silicon group into the above-mentioned oxyalkylene polymer having a functional group. Processes for the preparation of such oxyalkylene polymers are disclosed in the U.S. patents previously incorporated herein by reference. Such oxyalkylene polymers containing at least one reactive silicone group per molecule may also be reacted with other groups or polymers reactive with such oxyalkylene polymer as disclosed in the above mentioned U.S. patents.

In one embodiment, the flexible polymer used in the adhesive composition is a silyl terminated prepolymer prepared by contacting a polyol as described herein with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol, preferably the contacting is performed without addition of catalyst.

Polyols which may be used to prepare the silyl terminated prepolymer include polyols useful in preparing polyurethane prepolymers useful in adhesive and elastomer applications and are well known to those skilled in the art. Bhat et al., U.S. Pat. No. 5,672,652, see column 4, lines 5 to 60, (relevant parts incorporated herein by reference) discloses the preferred polyols useful in preparing the silane terminated prepolymers. The polyols are prepared by reacting an initiator, a compound having one or more active hydrogen atoms, with an alkylene oxide in the presence of a suitable catalyst under appropriate conditions for the alkylene oxide to react with one or more active hydrogen moieties of the initiator so as to add a series of ether units to the initiator thereby preparing a polyol. Initiators which are useful in this invention are well-known to those skilled in the art. Preferable initiator compounds which are employed to prepare the polyols are compounds having 1 to 8 active hydrogens, preferably 2 to 8, more preferably 2 to 4, and most preferably 2 to 3 active hydrogens. Preferable initiator compounds include, for example, alcohols, glycols, low molecular weight polyols, glycerine, trimethylol propane, pentaerythritol, glycosides, sugars, ethylene diamine, diethylenetriamine, and the like. Particularly suitable glycols include, for example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,6-pentylene glycol, neopentyl glycol and various hexane diols, mixtures thereof and the like. Alkylene oxides useful include ethylene oxide, propylene oxide, 1,2-butylene oxide, 2,3-butylene oxide, or mixtures thereof. Most preferred alkylene oxides are ethylene oxide and propylene oxide, with propylene oxide most preferred. Combinations of the above mentioned alkylene oxides may be used in random or block polymers.

Preferably, the polyols used in preparing the silane terminated prepolymers are high molecular weight polyols prepared by the process which comprises first, contacting one or more initiators with one or more alkylene oxides in the presence of a catalyst comprising calcium having counterions of carbonate and a $C_6$ to $C_{10}$ alkanoate in a solvent which does not contain active hydrogen atoms. The mixture is exposed to conditions at which the alkylene oxides react with the compound containing more than one active hydrogen atom. Preferably the process is performed such that a polyol is prepared which has an equivalent weight of from about 1,000 to about 20,000, a poly dispersity of about 1.2 or less and a residual calcium level of from about 0 to about 2,000 parts per million (ppm). The preferred catalyst used in preparing the polyols is a calcium catalyst which contains both carbonate and $C_6$ to $C_{10}$ alkanoate counterions. The catalyst is dispersed or dissolved in a dispersant or solvent which has no active hydrogen atoms capable of initiating a polyether. Preferably, the solvent or dispersant is a hydrocarbon or mixture of hydrocarbons and more preferably, mineral spirits. Preferably the alkanoate counterions are $C_8$ residues of organic acids. In a preferred embodiment, the alkanoates are derived from substantially pure organic carboxylic acids. Preferably the pure carboxylic acids are synthetic, as synthetic carboxylic acids generally exhibit higher purities. The carbonate counterions result from the contacting of the calcium and the organic carboxylic acid with carbon dioxide. The ratio of calcium ions to carboxylic acid ions is from about 1.0:0.5 to about 1.0:1.0. Preferably the ratio is between about 1.0:0.5 and about 1.0:0.9. The catalysts may be prepared by contacting the appropriate ratio of calcium hydroxide with a $C_{6-10}$ carboxylic acid and bubbling carbon dioxide through the mixture to form carbonate moieties. In the preparation of the preferred high molecular weight polyols, the initiator and alkylene oxides are generally contacted without the use of the solvent. Typically such contacting takes place in the absence of oxygen and atmospheric moisture, under an inert atmosphere, such as nitrogen or argon. The ratio of initiator to polyol is chosen to achieve the desired molecular weight or equivalent weight of the polyol. This ratio can be readily calculated by one skilled in the art. The amount of catalyst used is sufficient such that the residual catalyst remaining in the polyol upon completion of the reaction is about 0 part per million or greater more preferably about 200 parts per million or greater, even more preferably about 300 parts per million or greater and most preferably about 400 parts per million or greater, and preferably about 2,000 parts per million or less, more preferably about 1,000 parts per million or less, even more preferably about 800 parts per million or less and most preferably about 400 parts per million or less. In some embodiments, it may be desirable to remove all of the residual catalyst where the catalyst is not needed for a further reaction and where the catalyst may impact the properties of the ultimate adhesive. This can be achieved by contacting the polyether polyol of the invention with magnesium silicate or phosphoric acid and filtering the polyol with diatomaceous earth. The complex of the calcium catalyst and the additives are removed on the filter material. In those embodiments where the calcium is removed, the resulting parts per million of the catalyst remaining in the polyol can be about 0.

The reactants are reacted at a temperature of about 90° C. or greater, more preferably about 100° C. or greater and most preferably about 110° C. or greater, and preferably at a temperature of about 150° C. or less, more preferably about 130° C. or less and most preferably about 120° C. or less. The reactants are contacted for a time sufficient to prepare the desired high molecular weight polyol. The reaction time is controlled by the feed rate, reactor size, catalyst concentration and temperature. One skilled in the art can determine the appropriate time based on these variables. The unreacted polyols and initiators may be removed from the reaction by stripping them off using means well-known to those skilled in the art.

The polyether polyol preferably has a weight average molecular weight of about 2,000 or greater, more preferably about 3,000 or greater, even more preferably about 6,000 or greater, even more preferably about 10,000 or greater and most preferably 12,000 or greater. The resulting polyether polyol preferably has a weight average molecular weight of about 20,000 or less, more preferably about 16,000 or less, even more preferably about 14,000 or less and most preferably about 12,000 or less. The resulting high molecular weight polyol preferably has a polydispersity of about 1.2 or less and more preferably about 1.12 or less. Preferably the polyol used in the invention corresponds to Formula 5.

$$R^3\text{—}((CH(R^4)CH(R^4)O)_q\text{—}H)_p \qquad (5)$$

wherein:

$R^3$ is the residue of a compound having from about 1 to about 8 hydrogen atoms;

$R^4$ is independently in each occurrence a $C_{1-6}$ saturated or unsaturated hydrocarbon chain;

q is independently in each occurrence a number such that the equivalent weight of the polyol is from about 1,000 to about 20,000; and p is independently in each occurrence from about 1 to 8. Preferably $R^3$ is a $C_{1-8}$ alkyl or cycloalkyl moiety or oxygen. More preferably, $R^3$ is a $C_2$ to $C_4$ alkyl group or oxygen. $R^4$ is preferably hydrogen, methyl or ethyl and most preferably hydrogen or methyl. q is independently in each occurrence a number such that the equivalent weight of the polyol is from about 2,000 to about 16,000, more preferably from about 5,000 to about 16,000 and most preferably from about 10,000 to about 14,000. p is preferably 4 or less and more preferably 3 or less.

The polyols also demonstrate a low unsaturation level, preferably about 0.04 milliequivalent of unsaturation per gram of polyol or less and more preferably about 0.02 milliequivalent of unsaturation per gram of polyol or less.

Also included as useful polyols in this embodiment are polymers having a polyolefin backbone and terminal hydroxyl groups. Examples of such polyols are Kraton™ polyethylene/butylene polymers having terminal hydroxyls such as Kraton™ Liquid L-2203 polymer.

Polyalkyleneoxide based polyether polyols prepared using double metal cyanide catalysts can also be used in this invention. They are especially attractive because of their low unsaturation level.

The polyols can be reacted with an isocyanato silane to prepare reactive silicone functional prepolymers. Such isocyanato silane requires a silane group with a hydrolyzable moiety attached thereto. Isocyanato silanes useful in the invention are described in U.S. Pat. No. 4,618,656 at column 3, lines 24 to 34, incorporated herein by reference. Preferably such isocyanato silanes correspond to Formula 6.

(6)

wherein a, $R^1$ and X are as defined hereinbefore. Z is independently in each occurrence, $C_{1-40}$ divalent hydrocarbyl moiety. Z is preferably a $C_{1-20}$ divalent hydrocarbyl moiety, preferably $C_{1-10}$ alkyl preferably referably $C_{1-3}$ alkylene and most preferably methylene.

The reaction of the polyol with an organo functional silane can be performed using conventional processes such as those disclosed in U.S. Pat. No. 4,625,012, incorporated herein by reference. The use of the high molecular weight polyols described above allow the preparation of silane terminated polyethers by the reaction of isocyanato silanes with the polyols without the addition of additional catalysts. The residual calcium catalyst from the polyol formation reaction sequence described above is sufficient to catalyze the reaction. If desired, a standard polyurethane catalyst such as those disclosed in U.S. Pat. No. 4,625,012 at column 5, lines 14 to 23, may be added. The reaction of the isocyanato silane with a polyol can take place at a temperature of about 0° C. or greater, more preferably about 25° C. or greater, and preferably about 150° C. or less and most preferably about 80° C. or less. This reaction is preferably performed under an inert atmosphere. The reaction is allowed to proceed until the desired silane functionality is achieved. Where a high molecular weight polyol is used it is preferred that a sufficient amount of isocyanato silane be used to react with all of the hydroxyl functionality of the polyol. In this embodiment, the resulting prepolymer exhibits excellent physical properties and stability. Where the polyol used is a lower molecular weight polyol, it is desirable to use less than a stoichiometric amount of isocyanatosilane as compared to hydroxyl moieties, such that the resulting product has some residual hydroxyl moieties in the prepolymer prepared. This results in a product that has better physical properties at cure. In this embodiment, the ratio of hydroxyl moieties to isocyanate moieties of the isocyanoto silanes is preferably from about 0.75:1.0 to 0.95:1.0.

In another embodiment, the polymer may be a polyurethane based backbone having hydrolyzable silane groups. Such materials are disclosed in Chang, U.S. Pat. No. 4,622,369 and Pohl, U.S. Pat. No. 4,645,816, relevant portions incorporated herein by reference.

In another embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be added to the polymer at the point of unsaturation by a hydrosilylation reaction. This reaction is described in Kawakubo, U.S. Pat. No. 4,788,254, column 12, lines 38 to 61; U.S. Pat. No. 3,971,751; U.S. Pat. No. 5,223,597; U.S. Pat. No. 4,923,927; U.S. Pat. No. 5,409,995 and U.S. Pat. No. 5,567,833, incorporated herein by reference.

The polymer prepared can be cross-linked in the presence of a hydrosilylation cross-linking agent and hydrosilylation catlyst as described in U.S. Pat. No. 5,567,833 at column 17, lines 31 to 57, and U.S. Pat. No. 5,409,995, incorporated herein by reference.

Selection of the polymer used in the adhesive is important to achieving short and long term adhesion to painted substrates and ceramic frits on glass substrates without the need to prime the surface of the substrate. The preferred polymers are trialkoxysilane functional polyethers or polyurethanes wherein the polyether or polyurethane backbone has a number average molecular weight of about 6,000 or greater or a dialkoxysilane functional polymer having a polyether or polyurethane backbone. Preferably, the trialkoxysilane functional polymer having a polyether or polyurethane backbone has a weight average molecular weight of about 10,000 or greater and more preferably about 12,000 or greater. Preferably the polyether or polyurethane backbone has a number average molecular weight of 20,000 or less and most preferably 16,000 or less.

The prepolymer is present in the adhesive composition in sufficient amount such that the adhesive is capable of bonding glass to another substrate, such as metal, plastic, a composite or fiberglass. Preferably the substrates are painted and more preferably the substrates are painted with acid resistant paints, such as acrylic melamine silane modified coatings (DuPont Gen IV paints), melamine carbamate coatings, two part urethane coatings, or acid epoxy cure coatings. The adhesives of the invention are especially good for bonding windows to acrylic melamine silane modified coatings (DuPont Gen IV paints). Preferably the prepolymer is present in an amount of about 30 percent by weight or greater based on the weight of the adhesive, more preferably about 40 percent by weight or greater, even more preferably about 45 percent by weight or greater and most preferably about 50 percent by weight or greater. More preferably the prepolymer is present in an amount of about 99.8 percent by weight or less based on the weight of the adhesive and most preferably about 85 percent by weight or less.

The adhesive composition further comprises one or more tin catalysts which catalyzes the silanol condensation reaction. Tin catalysts useful for the silanol condensation reaction are well-known in the art. The selection of the catalyst is important to achieving the desired bonding of the adhesive of the invention to a painted substrate and/or an organic frit on glass preferably without a primer. The choice of catalyst is impacted by the choice of polymer. For trialkoxysilane functional polymers the catalyst can be a dialkyltin carboxylate (dialkyltin (IV) salts of organic carboxylates) or dialkyltin alcoholate, such as a dialkyltindialkenedione (which includes the (dialkyltinbisacetylacetonates)). For the dialkoxy functional polymers the preferred catalysts are the dialkyltin alcoholates. Preferably the alkyl groups on the catalysts are $C_{1-4}$ and most preferably methyl. The preferred catalysts for all polymers are the dialkyltin alcoholates, with dialkyltin diacetylacetonates being most preferred. Among preferred dialkyltin carboxylates are dibutyltin diacetate, dimethyltin dilaurate, dibutyltin dilaurate, dibutyltin maleate or dioctyltin diacetate and the reaction product of dialkyltin oxide and phthalic acid esters. Dialkyltin alcholates include the reaction products of dialkyltin oxides and alkanediones, such as dialkyltin diacetyl acetonates, such as dibutyltin diacetylacetonate (also commonly referred to as dibutyltin acetylacetonate. These catalysts may be used individually or in combinations of 2 or more. Among preferred dialkyltin carboxylates are adducts of dibutyltin oxide and phthalate esters available from Witco Corporation under the designation Fomrez SUL-11A, dimethyltin dicarboxylate available from Witco Corporation under the designation Fomrez UL-28, dibutyltin dilaurate available from Air Products under the designation T-12 and from Witco Corporation under the designation Fomrez SUL-4 and dibutyltin diacetate available from Air Products under the designation Dabco T-1 and from Witco Corporation under the designation Fomrez UL-1. The most preferred catalyst is dibutyltin bisacetylacetonate (dibutyltin dipentenedione) available from Nitto Kasei Co. Ltd. under the designation Neostann U-220. Catalysts which undergo hydrolytic disassociation at a faster rate are preferred. The amount of catalyst used in the formulation is that amount which facilitates the cure of the adhesive without causing degradation of the adhesive after cure and which facilitates bonding of the adhesive to the substrate. The preferred amount of catalyst used is dependent upon the choice of catalyst, and the amount and selection of adhesion promoter (depending on the basicity of the adhesion promoter, among other issues. Catalysts with slower hydrolytic disassociation requires a higher concentration to get the desired adhesion. Higher concentration of catalysts are preferred when the adhesion promoter has a lower basicity or concentration. The amount of catalyst in the adhesive formulation is preferably about 0.01 percent by weight or greater, more preferably about 0.1 percent by weight or greater, and most preferably about 0.2 percent by weight or greater, and preferably about 5 percent by weight or less, even more preferably about 1.0 percent by weight or less, even more preferably 0.5 percent by weight or less and most preferably about 0.4 percent by weight or less.

The adhesive composition may further comprise a curing agent for the siloxy moiety. Such compound can be a hydrolyzable silicone compound, such compounds are disclosed in U.S. Pat. No. 5,541,266, incorporated herein by reference. Hydrolyzable silicon compounds useful include those represented by formula 7:

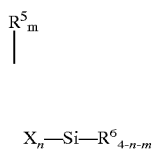

(7)

X represents a hydrolyzable group. $R^5$ represents a monovalent hydrocarbon group, and is preferably a lower alkyl group. $R^6$ represents a monovalent organic group containing an amino group or an imino group and having a ratio of carbon atom number to nitrogen atom number (C/N ratio) of more than 3. The C/N ratio is preferably 4 or more 3; m represents 0, 1 or 2 and preferably 0 or 1; n represents 1, 2 or 3; and (m+n) is less than 4 and preferably (m+n) is 3. n Is preferably 2 or 3. The molecular weight of the hydrolyzable silicon compound is preferably 1,000 or less. $R^6$ includes $R^7 N(R^8)$—$R^9$—$N(R^{10})$—$R^{11}$ wherein $R^7$ and $R^8$ each represents a divalent hydrocarbon group containing 2 or more carbon atoms, and at least one of $R^7$ and $R^9$ contains 4 or more carbon atoms. $R^8$, $R^{10}$, and $R^{11}$ each represents a hydrogen atom or a monovalent hydrocarbon group, preferably an alkyl group containing 1 to 3 carbon atoms.

The specific but non-limiting examples of the above mentioned hydrolyzable silicon compound are shown below

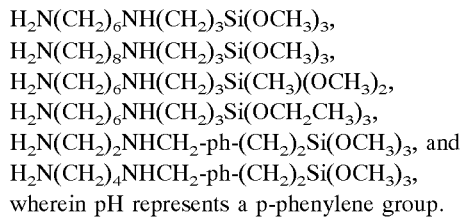

wherein pH represents a p-phenylene group.

The hydrolyzable silicon compound is used in an amount of from about 0.01 to about 20 parts by weight, and preferably from about 0.1 to about 10 parts by weight, per 100 parts by weight of the oxyalkylene polymer having a reactive silicon group and capable of cross-linking on siloxane bond formation. If it exceeds about 20 parts by weight, the rubber physical properties after curing are adversely affected.

Further examples of such hydrolyzable silicone compounds capable of cross-linking the silicone reactive polymer are disclosed in U.S. Pat. No. 5,541,266, incorporated herein by reference. Other such potential additives include organic silicone compounds B as disclosed in U.S. Pat. No. 4,837,274, see columns 7, line 12 to column 9, line 15, incorporated herein by reference.

The adhesive formulation may contain other additives commonly used in adhesives formulations as known to those skilled in the art. The adhesive of the invention may be formulated with fillers known in the art for use in adhesive compositions. By the addition of such materials, physical properties such as viscosity, flow rates, sag and the like can be modified. However, to prevent premature hydrolysis of the moisture sensitive groups of the prepolymer, it is preferable to thoroughly dry the fillers before admixture therewith.

Optional components of the adhesive of the invention include reinforcing fillers. Such fillers are well-known to those skilled in the art and include carbon black, titanium dioxide, calcium carbonate, surface treated silica, titanium oxide, fumed silica, and talc. Preferred reinforcing fillers comprise carbon black. In one embodiment, more than one reinforcing filler may be used, of which one is carbon black, and a sufficient amount of carbon black is used to provide the desired black color to the adhesive. Preferably the only reinforcing filler used is carbon block. The reinforcing fillers are used in sufficient amount to increase the strength of the adhesive and to provide thixotropic properties to the adhesive. Preferably the reinforcing filler is present in an amount of about 1 part by weight of the adhesive composition or greater, more preferably about 15 parts by weight or greater and most preferably about 20 parts by weight or greater. Preferably the reinforcing filler is present in an amount of about 40 parts by weight of the adhesive composition or less, more preferably about 35 parts by weight or less and most preferably about 33 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitate formulation of a pumpable adhesive. Preferably the clay is in the form of pulverized powder, spray dried beads or finely ground particles. Clays may be used in an amount of about 0 part by weight of the adhesive composition or greater, more preferably about 1 part by weight or greater and even more preferably about 6 parts by weight or greater. Preferably the clays are used in an amount of about 20 parts by weight or less of the adhesive composition and more preferably about 10 parts by weight or less.

The adhesive composition of this invention may further comprise plasticizers so as to modify the rheological properties to a desired consistency. Such materials are preferably free of water, inert to reactive groups and compatible with the polymer used in the adhesive. Suitable plasticizers are well-known in the art and preferable plasticizers include alkyl phthalates such as dialkyl phthalate, wherein the alkyl phthalate is linear with mixed $C_7$, $C_9$ and $C_{11}$ alkyl groups, diisononyl phthalate diisododecyl phthalate, dioctylphthalate or dibutylphthalate, partially hydrogenated terpene, commercially available as "HB-40", trioctyl phosphate, epoxy plasticizers, toluene-sulfamide, chloroparaffins, adipic acid esters, castor oil, toluene, xylene, n-methylpyrolidinone and alkyl naphthalenes. The preferred plasticizers are the phthalates. The more preferred plasticizers are the dialkyl phthalates wherein the alkyl group is mixed linear $C_7$, $C_9$ and $C_{11}$, diisononyl phthalate or diisododecyl phthalate. The amount of plasticizer in the adhesive composition is that amount which gives the desired rheological properties and which is sufficient to disperse the catalyst and other components in the system and to give the desired viscosity. The amounts disclosed herein include those amounts added during preparation of the prepolymer and during compounding of the adhesive. Preferably plasticizers are used in the adhesive composition in an amount of about 0 part by weight or greater based on the weight of the adhesive composition, more preferably about 5 parts by weight or greater, even more preferably about 10 parts by weight or greater and most preferably about 20 parts by weight or greater. The plasticizer is preferably used in an amount of about 45 parts by weight or less based on the total amount of the adhesive composition, more preferably about 40 parts by weight or less, even more preferably about 30 parts by weight or less and most preferably about 25 parts by weight or less.

The adhesive of this invention may further comprise stabilizers which function to protect the adhesive composition from moisture, thereby inhibiting advancement and preventing premature cross-linking of the polymer capable of cross-linking in the adhesive formulation. Included among such stabilizers are hydrocarbyl alkoxy silanes, such as vinyl trimethoxy silane, diethylmalonate and alkylphenol alkylates. Such stabilizers are preferably used in an amount of about 0.1 part by weight or greater based on the total weight of the adhesive composition, preferably about 0.5 part by weight or greater and more preferably about 0.8 part by weight or greater. Such stabilizers are used in an amount of about 5.0 parts by weight or less based on the weight of the adhesive composition, more preferably about 2.0 parts by weight or less and most preferably about 1.4 parts by weight or less.

An adhesion promoter can be added to enhance adhesion to either the glass or to the surface of the substrate to which the glass is bonded.

Selection of the adhesion promoter is important in achieving adhesion to a wide variety of paint systems and optionally ceramic frit systems on glass without the need for a primer for either the paint or the ceramic frit. The adhesion promoters useful are primary or secondary amino straight chain alkyl trialkoxy silanes. Preferred primary or secondary amino straight chain alkyl trialkoxy silanes correspond to the formula

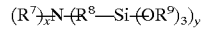

wherein $R^7$ is independently in each occurrence a straight chain alkyl or aminoalkyl;
$R^8$ is independently in each occurrence a straight chain alkylene group;
$R^9$ is independently in each occurrence an alkyl group;
x is independently in each occurrence an integer of 0 or 1; and
y is independently in each occurrence an integer of 1 or 2;

wherein x+y is 2 or less.

Preferably $R^7$ is $C_{1-6}$ alkyl or $C_{1-6}$ alkyl amino; more preferably $C_{1-3}$ alkyl or $C_{1-3}$ alkylamino and most preferably ethyl amino. The amine moiety of the alkylamine group of $R^7$ is preferably located on the carbon atom furthest from the primary or secondary amine group. $R^8$ is preferably $C_{1-6}$, alkylene, more preferably $C_{2-4}$ alkylene and most preferably $C_3$ alkylene (propylene). $R^9$ is preferably $C_{1-6}$ alkyl, most preferably, $C_{1-2}$ alkyl (methyl or ethyl) and most preferably $C_1$ alkyl (methyl). x is preferably 0 and y is preferably 2. Among useful adhesion promoters are gamma-aminopropyltrimethoxy silane, n-beta-(aminoethyl)-gamma-aminopropyltrimethoxy silane, n-(2-aminoethyl)-3-aminopropylmethyldimethoxy silane, 3-aminopropyl-methyldimethoxy silane, bis-(gamma-trimethoxysilyl-propyla)mine, Among more preferred adhesion promoters are N-2-aminoethyl-3-aminopropyl trimethoxysilane (available from Hills America Inc. under the tradename DAMO-P), 3-aminopropyltrimethoxysilane (available from Witco Corporation under the designation A-1110), 3-aminopropyltriethoxysilane (available from Witco Corporation under the designation A-1100) and bis-(3-trimethoxysilylpropyl)amine (available from Witco Corporation under the designation A-1170. The most preferred adhesion promoter is bis-(3-trimethoxysilylpropyl)amine. The amount of the adhesion promoter is chosen to be an effective amount to achieve good short term and long term adhesion. The particular effective amount needed is dependent on the choice of catalyst, amount of catalyst and basicity of the primary or secondary amine in the adhesion promoter. Adhesion promoters with a higher basicity are generally used in lower concentrations than those with a lower basicity. If too much or little adhesion promoter is used poor adhesion to the substrate may result. At higher concentrations of the catalyst, lower amounts of adhesion promoter are preferably used. If too much total adhesion promoter and catalyst are used the adhesion to the substrate is poor. Preferably, the adhesion promoter is used in an amount of about 0.1 percent by weight of the adhesive or greater and more preferably 0.5 percent by weight or greater. Preferably the adhesion promoter is used in an amount of 1.2 percent by weight or less based on the adhesive weight and more preferably 1.0 percent by weight or less.

In addition to the adhesion promoters described above other adhesion promoters for adhesion to coated surfaces are the amino alkoxy silanes, vinyl alkoxy silanes, isocyanto alkoxy silanes and isocyanurate functional alkoxy silanes. More preferred of the additional adhesion promoters include gamma-glycidoxypropyltrimethoxy silane, gamma-isocyanatopropyltrimethoxy silane, n-phenyl-gama-aminopropyltrimethoxysilane, gamma-isocyanatopropylmethyldimethoxy silane, gamma-isocyanatopropyltriethoxy silane, beta (3,4-epoxycyclohexyl)ethyltriethoxysilane, gamma-glycidoxypropylmethyl-dirnethoxy silane, tris(gamma-trimethoxysilylpropyl)iso-cyanurate, vinyltriethoxysilane, or vinyltrimethoxysilane. Such additional adhesion promoters are present in sufficient amount to promote the adhesion of the adhesive to the glass or other substrate surface to the desired level usually determined by testing the lap shear strength and failure mode of the bond to the substrate. Preferably the amount of adhesion promoter is about 10 parts by weight or less based on the weight of the adhesive; more preferably 5 parts by weight or less and most preferably about 2 parts by weight or less. Preferably the amount of adhesion promoter is about 0.01 part by weight or greater based on the weight of the adhesive; more preferably 0.1 part by weight or greater and most preferably about 0.5 part by weight or greater.

The adhesive composition can also contain heat stabilizers known in the art. Among preferred heat stabilizers are alkyl substituted phenols, phosphites, sebacates, and cinnamates. Among more preferred heat stabilizers are bis(1,2,2,6,6,-pentamethy-4-piperidinyl) sebacate, Irgafox-168, ethylene bis(oxyethylene) bis(3-tert-butyl-4-hydroxy-5 (methylhydrocinnamate), tetrakis isodecyl 4,4' isopropylidene diphosphite, and butylated hydroxytoluene. The preferred class of heat stabilizers are the sebactes such as bis(1,2,2,6,6,-pentamethy-4-piperidinyl) sebacate. Preferably the amount of heat stabilizer is about 5 parts by weight or less based on the weight of the adhesive; more preferably 2 parts by weight or less and most preferably about 1.0 part by weight or less. Preferably the amount of heat stabilizer is about 0.01 part by weight or greater based on the weight of the adhesive; and most preferably about 0.5 part by weight or greater.

Other components commonly used in adhesive compositions may be used in the adhesive composition of this invention. Such materials are well-known to those skilled in the art and may include ultraviolet stabilizers and antioxidants.

As used herein, all parts by weight relative to the components of the adhesive composition are based on 100 total parts by weight of the adhesive composition and all percentages by weight are based on the weight of the adhesive composition. The sealant composition of this invention may be formulated by blending the components together using means well-known in the art. Generally the components are blended in a suitable mixer. Such blending is preferably conducted in an inert atmosphere and in the absence of atmospheric moisture to prevent premature reaction. It may be advantageous to add any plasticizers to the reaction mixture for preparing the prepolymer so that such mixture may be easily mixed and handled. Alternatively, the plasticizers can be added during blending of all the components. Once the sealant composition is formulated, it is packaged in a suitable container such that it is protected from atmospheric moisture. Contact with atmospheric moisture could result in premature cross-linking of the prepolymer.

The sealant composition of the invention is used to bond porous and nonporous substrates together. The sealant composition is applied to the glass surface or the other substrate surface and is thereafter contacted with a secondsurface of glass or substrate. Thereafter the adhesive is exposed to curing conditions. In a preferred embodiment the other substrate is a plastic, metal, fiberglass or composite substrate which may optionally be painted. This method is especially effective for substrates painted with an acid resistant paint. In preferred embodiments, the surfaces to which the adhesive is applied are cleaned prior to application, see for example U.S. Pat. Nos. 4,525,511; 3,707,521 and 3,779,794, incorporated herein by reference. The glass is prepared by cleaning the surface to which the adhesive composition is to be applied. A solvent wipe can be used to do this. Generally a cloth or other device with an appropriate solvent is used to clean the surface. Thereafter a primer may be applied to the portion of the window to which the adhesive is to be applied. Glass primers and application methods for such primers are well-known in the art. Typically the primer is applied with a brush or by a robot. A primer is not necessary where the adhesive is formulated so as to eliminate the need for one. In a preferred embodiment of the invention, the substrate is a building or an automobile. The adhesive is preferably deposited as a bead on the portion of the glass to be bonded into the substrate. The bead can be deposited by any known method to those skilled in the art. In one embodiment, the bead can be deposited using a caulking gun or similar type of manual application device. In another embodiment, the bead may be deposited by an extrusion apparatus such as a robotic extrusion apparatus. The adhesive is located on the portion of the window which will be contacted with the structure into which it will be bonded. In one preferred embodiment, the adhesive is placed about the periphery of one face of the window. Typically the adhesive is in the form of a bead located about the periphery of the window. Preferably the bead is a profiled shape along the cross-sectional plane. In the embodiment where the glass is window glass designed for use in automobiles, the bead is applied to the portion of the glass to be contacted with the flange of the automobile window. In automobiles the adhesive bead is placed on a ceramic frit coated about the edge of the window. Preferably the frit is based on zinc, bismuth or a mixture thereof. The window can then be placed into the structure with the adhesive contacting both the window and the structure to which the window is to be bonded into. This contacting is performed by means well-known to those skilled in the art. In particular, the glass can be placed in the structure by hand, by the use of a robot and the like. Generally, the sealants of the invention are applied at ambient temperature in the presence of atmospheric moisture. Exposure to atmospheric moisture is sufficient to result in curing of the sealant. Curing may be further accelerated by applying heat to the curing sealant by means of convection heat or microwave heating. Preferably the sealant of the invention is formulated to provide a working time of about 6 minutes or greater, more preferably about 10 minutes or greater. Preferably the working time is about 15 minutes or less and more preferably about 12 minutes or less. Further, the adhesive of the invention demonstrates a cure rate after six hours of about 50 psi (3.45 mPa) or greater, more preferably about 70 psi (4.83 mPa) or greater after six hours and more preferably about 100 psi (6.90 mPa) or greater after six hours.

Molecular weights as described herein are determined according to the following procedure: determined using the Waters Model 590 Gel Permeation Chromatograph. This unit is connected to a multiwave length detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

Specific Embodiments

The following examples are provided to more fully illustrate the invention, and are not intended to limit the scope of the claim. Unless otherwise stated, all parts and percentages are by weight.

The following are tests used for the prepared sealants.

Quick Knife Adhesion Test

A 6.3 mm (width)×6.3 mm (height)×76.2 mm (length) size sealant bead is placed on 101.6 mm×101.6 mm piece of an acid resistant paint panel and the assembly is cured for a specific time in the condition of 23° C. and 50 percent relative humidity. The cured bead is then cut with a razor blade through to the painted surface at a 45 degree angle while pulling back the end of the bead at 180 degree angle. Notches are cut every 3 mm on the painted surface. The degree of adhesion is evaluated as adhesive failure (AF) and/or cohesive failure (CF). In case of adhesive failure, the cured bead can be separated from the painted surface, while in cohesive failure, separation occurs within the sealant bead as a result of cutting and pulling. The tested paint substrate can be used as supplied, or treated by wiping with isopropanol (IPA) or naphtha (NP). For the sealant of the invention, adhesion of a sealant develops sooner to the treated substrate than to the untreated one.

Lap Shear Test

A sealant approximately 6.3 mm wide by 8 mm high is applied along the width of the glass and approximately 6 mm to 12 mm from the primed end. The paint substrate is immediately placed on the sealant and the sample is allowed to cure at the condition of the 23° C. and 50 percent relative humidity for 5 days. The sample was then pulled at a rate of 1 inch/minute (2.5 cm/min) with an Instron Tester.

EXAMPLE 1

Preparation of a High Molecular Weight Polyether Diol

A mixture of 97.3 grams of polyglycol P1000, a 1,000 MW polypropylene oxide diol from which essentially all of the catalyst (KOH) had been removed, and 9.73 g of 10 percent calcium, CEM ALL D10 (50 percent by weight calcium isooctoate in mineral spirits carrier, and which contains no glycol ether stabilizers, available from OMG Americas, Cleveland, Ohio) was placed in a dry, steam heated and stirred pressure reactor which was then purged with nitrogen several times. The mixture was heated to 100° C. and 1,985 grams of propylene oxide was added with rapid stirring. The product was a liquid having an equivalent weight of 5,218 determined by a wet method for hydroxyl analysis. The number average molecular weight of the product was 9,978, as determined by gel permeation chromatography using polyglycol standards and a polydispersity of 1.1 determined by size exclusion chromatography (gel permeation chromatography).

EXAMPLE 2

Preparation of High Molecular Weight Silyl Terminated Polyether

In a dried, heated, nitrogen purged and mechanically stirred 500 milliliter round bottom flask, were added 134.94 grams of the product of Example 1, 6.33 grams of Siliquest A1310, gamma-isocyanatopropyltriethoxy-silane, and 1.52 grams dibutyl tin dilaurate. The mixture was heated to 100° C. with stirring and immediately allowed to cool to room temperature. A 30 mil. film was drawn on glass plates. The film was allowed to moisture cure overnight. The film was tack free in about 24 hours. The film was placed in a 70 percent humidity chamber for 5 days and then placed in an oven at 50° C. overnight. The cured film had a 73 psi tensile strength, 35 psi modulus, and a 347 percent elongation at break.

EXAMPLES 3 to 7

Moisture curable sealant compositions were prepared under anhydrous conditions by compounding silylated prepolymers described below with the components described below. The components, except carbon black, were charged to a 2 gallon planetary mixer and mixed for 20 minutes under vacuum, then dried carbon black was added and mixed for 20 minutes under vacuum. Finally, the adhesive was filled into plastic tubes. Each sealant was tested for adhesion to primed glass, primed paint, unprimed DuPont Gen IV paint, unprimed 2 part urethane paints, and unprimed diamond coat paint using the Quick Knife adhesion test. The sealants were also tested for tensile strength, elongation and lap shear strength. The formulation components are compiled in Table 1. The formulations are compiled in Table 2 and the results of testing are compiled in Table 3.

TABLE 1

| | |
|---|---|
| Prepolymer A | Kaneka S-303H methoxysilyl-terminated polypropyleneoxide based polyether |
| Prepolymer B | Prepolymer of Example 2 |
| Prepolymer C | Kaneka SAX-400 trifunctional polypropyleneoxide polyether with dimethoxymethyl silyl terminal groups having a molecular weight of about 20,000 |
| Plasticizer | Palatinol 711P mixed branched alkyl phthalate plasticizer |
| Catalyst | Neostann U-220 dibutyl tin bisacetylacetonate |
| Stabilizer A | Silquest A-171 vinyl trimethoxy silane |
| Adhesion Promoter A | Silquest A-1120 n-butyl(aminoethyl) gamma-aminopropyl trimethoxysilane |
| Adhesion Promoter B | Silquest A-174 Gamma-methyl acryloxy propyl trimethoxy silane |
| Adhesion Promoter C | Silquest A-187 Gamma-glycidyl trimethoxypropyl silane |
| Heat Stabilizer B | |

TABLE 2

| Example/Component | 3 | 4 | 5 | 6 | 7 |
|---|---|---|---|---|---|
| Prepolymer A | 43.96 | 46.28 | 46.82 | | |
| Prepolymer B | | | | 49.25 | |
| Prepolymer C | | | | | 55.6 |
| Plasticizer | 20.35 | 21.03 | 21.28 | 21.10 | 15 |
| Catalyst | 0.44 | 0.46 | 0.47 | 0.45 | 0.40 |
| Stabilizer A | | 0.76 | 1.71 | 0.70 | |
| Adhesion Promoter A | 1.14 | | | | 1* |
| Adhesion Promoter B | 0.73 | | | | |
| Adhesion Promoter C | | 1.17 | | 1.10 | |
| Carbon Black | 33.38 | 30.30 | 30.66 | 27.40 | 27 |
| Heat Stabilizer B | | | | | 1 |

*DAMO-P adhesion promoter from Hüls America, same chemical composition as Adhesion Promoter A

TABLE 3

| Example/Test | 3 | 4 | 5 | 6 | 7 |
|---|---|---|---|---|---|
| Quick Knife Adhesion | 100% CF | | | | |
| Glass Primer | 100% CF | 100% CF | 100% CF | 100% CF | |
| Paint Primer | 100% CF | 100% CF | 100% CF | 100% CF | |
| Gen. IV | 100% CF | 100% CF | 100% CF | 100% CF | 100% CF 332 psi |
| 2 Part Paint | 100% CF | | | | |
| Diamond Coat | 100% CF | | | | 100% CF 506 psi |
| Cure Rate | | | | | |
| 1.5 Hour psi | | | 5 | 34 | |
| 3 Hour psi | | | 40 | 56 | |
| 6 Hour psi | | | 134 | 134 | |
| Tensile Strength psi | | 1028 | | 1025 | |
| Elongation Percentage | | 378 | | 423 | |
| Lap Shear Mpa | | 2.4 | | 3.4 | |

EXAMPLE 8

Synthesis of Silylated Prepolymer

A polyether silylated prepolymer was prepared by thoroughly mixing 2366.2 grams (0.388 eq.) of polypropylene glycol diol having hydroxyl equivalent weight of 6100 with 83.8 grams (0.409 eq.) of isocyanatopropyl trimethoxysilane. The reaction was carried out in a reaction vessel at 75° C. under nitrogen blanket for about 4 hours until no isocyanate groups could be detected by infrared analysis. 1050 Grams of dialkyl phthalate plasticizer containing mixed $C_7$-, $C_9$- and $C_{11}$-linear alkyl group was added to the mixture and thoroughly mixed. The viscosity of the reaction mixture at 23° C. was 17,700 cps.

EXAMPLE 9

Synthesis of Silylated Prepolymer

A polyether silylated prepolymer was prepared by thoroughly mixing 2,355.4 grams (0.438 eq.) of polypropylene glycol triol having hydroxyl equivalent weight of 5,373 with 94.7 grams (0.462 eq.) of isocyanatopropyl trimethoxysilane. The reaction was carried out in a reaction vessel at 75° C. under nitrogen blanket for about 4 hours until no isocyanate groups could be detected by infrared analysis.

1,050 Grams of the dialkyl phthalate plasticizer were added to the mixture and thoroughly mixed. The viscosity of the reaction mixture at 23° C. was 67,800 cps.

EXAMPLES 10–13

Polyether silylated prepolymers were prepared by reacting mixed diols containing polypropylene glycol diols having hydroxyl equivalent weights of 6,100 and 1,000 with isocyanatopropyl trimethoxysilane. The reaction was carried out in a reaction vessel by first heating to 75° C., then to 85° C. under nitrogen blanket for about 4 hours until no isocyanate groups could be detected by infrared analysis. A dialkyl phthalate plasticizer was added to each mixture and thoroughly mixed. The amounts of the reactants, the plasticizer used and viscosity data are listed below:

TABLE 4

|  | Example 10 | Example 11 | Example 12 | Example 13 |
|---|---|---|---|---|
| Polypropylene glycol diol, ew = 6100 | 950 | 900 | 850 | 800 |
| Polypropylene glycol diol, ew = 1000 | 50 | 100 | 150 | 200 |
| Isocyanato-propyl trimethoxy-silane | 45.9 | 54.9 | 54.6 | 72.8 |
| Dialkyl plithalate plasticizer | 448 | 452 | 456 | 460 |
| Total | 1493.9 | 1506.9 | 1510.6 | 1532.8 |
| Viscosity, 23° C. cps | 15800 | 14290 | 11600 | 9760 |

EXAMPLES 14–17

Compounding of the Prepolymers

The silylated prepolymers described above were compounded with vinyl trimethoxysilane, gamma-glycidoxypropyltrimethoxysilane, catalyst and carbon black. The prepolymers, vinyl trimethoxysilane, gamma-glycidoxypropyltrimethoxysilane, catalyst were charged to a 2 gallon planetary mixer and mixed for 20 minutes under vacuum, then dried carbon black was added and mixed for 20 minutes under vacuum. Finally, the adhesive was filled into plastic tubes. Compositions and physical properties of some adhesives prepared listed in Table 5:

TABLE 5

|  | Example 14 | Example 15 | Example 16 | Example 17 |
|---|---|---|---|---|
| Prepolymer in Example 8 | 1169.6 | 877.2 | 584.8 | 292.4 |
| Prepolymer in Example 9 | 0.0 | 292.4 | 584.8 | 877.2 |
| Vinyl trimethoxy-silane | 16.0 | 16.0 | 16.0 | 16.0 |
| gamma-Glycidoxy propyltrimethoxy-silane | 11.2 | 11.2 | 11.2 | 11.2 |
| Dibutyl tin bis(acetyl-acetonate) | 3.2 | 3.2 | 3.2 | 3.2 |
| Carbon black | 400.0 | 400.0 | 400.0 | 400.0 |
| Total | 1600.0 | 1600.0 | 1600.0 | 1600.0 |
| Tensile strength, psi | 683 | 610 | 512 | 470 |
| Elongation, % | 351 | 299 | 222 | 191 |
| Storage modulus, 25 C | 10.23 | 8.12 | 7.22 | 4.72 |
| Cure rate, 23° C., 50% RH 3 hours | 15.8 | 35.8 | 75.4 | 87.1 |
| 6 hours | 43.7 | 69.5 | 137.6 | 140.3 |

EXAMPLES 18 to 57

Moisture curable sealant compositions were prepared under anhydrous conditions by compounding silylated prepolymers described below with the components described below. The components, except carbon black, were charged to a 2 gallon planetary mixer and mixed for 20 minutes under vacuum, then dried carbon black was added and mixed for 20 minutes under vacuum. Finally, the adhesive was filled into plastic tubes. Each sealant was tested for adhesion to unprimed DuPont Gen IV paint, unprimed 2 part polyurethane paint, unprimed BASF® Ureclear paint and unprimed PPG DiamondCoat® paint using the Quick Knife Adhesion test.

The adhesives were applied to unprimed coupons coated with different paint compositions. The coupons were exposed to the following conditions. All coupons were left open to the atmosphere at 23° C., 50 percent relative humidity for 7 days. Some of the coupons (Condition 1) were then exposed to 100° F. (37.8° C.) at 100 percent relative humidity for 7 days (Condition 2). Thereafter the coupons were tested according to the Quick Knife Adhesion test as described above. The results are compiled below in Table 6.

Ingredients used in the adhesive formulations:

| | | | |
|---|---|---|---|
| Prepolymer A | | Kaneka S-303H methoxysilyl-terminated polypropyleneoxide based polyether | |
| Prepolymer C | | Kaneka SAX-400 trifunctional polypropyleneoxide polyether with dimethoxymethyl silyl terminal groups having a molecular weight of about 20,000 | |
| Adhesion-Promoter | H | DAMO-P | N-2-aminoethyl-3-aminopropyltrimethoxysilane |
| Adhesion-Promoter | K | A1110 | 3-Aminopropyltrimethoxysilane |
| Adhesion-Promoter | L | A-1100 | 3-Aminopropyltriethoxysilane |
| Adhesion-Promoter | D | A-1170 (Y-9492) | Bis-(3-trimethoxysilylpropyl)amine |
| Adhesion-Promoter | E | Y-11639 | 3-Amino-2,2,dimethylpropyl-methyldimethoxysilane |
| Adhesion-Promoter | F | Y-15311 | Bis-(3-trimethoxysilyl-2-methylpropyl)amine |
| Adhesion-Promoter | G | Y-9669 | Phenylaminopropyltrimethoxysilane |
| Adhesion-Promoter | C | A-187 | 3-Glycidoxypropyltrimethoxysilane |
| Adhesion-Promoter | I | Y-5187 | 3-Isocyanatopropyltrimethoxysilane |
| Adhesion-Promoter | J | A-174 | 3-Methacryloxypropyltrimethoxysilane |
| Plasticizer | A | Palatinol N | Diisononyl phthalate |
| Plasticizer | B | Palatinol 711 P | mixed branched alkyl phthalate plasticizer |
| Stabilizer | A | Tinuvin 765 | Bis (1,2,2,6,6,-pentamethy-4-piperidinyl)sebacate |
| Stabilizer B | | Silquest A-171 | Vinyltrimethoxy silane |
| Filler | | CSX-316 | Carbon black |

TABLE 6

| Example | 18 | 19 | 20 | 21 | 22 | 23 | 24 | 25 | 26 | 27 | 28 | 29 | 30 | 31 |
|---|---|---|---|---|---|---|---|---|---|---|---|---|---|---|
| Polymer | C | C | C | C | C | C | C | C | C | C | C | C | C | C |
| Polymer Amount | 56.1 | 56.3 | 56.4 | 56.6 | 56.5 | 56.8 | 55.8 | 56.3 | 56.4 | 55.8 | 56.3 | 56.5 | 56.1 | 55.8 |
| Plasticizer | A | A | A | A | A | A | A | A | A | A | A | A | A | A |
| Plasticizer amount | 15.0 | 15.0 | 15.0 | 15.0 | 15.0 | 15.0 | 15.0 | 15.0 | 15.0 | 15.0 | 15.0 | 15.0 | 15.0 | 15.0 |
| Adhesion promoter AP | H | H | H | H | H | H | K | K | K | L | L | L | D | D |
| AP amount | 0.5 | 0.5 | 0.5 | 0.25 | 0.5 | 0.25 | 1.0 | 0.5 | 0.25 | 1.0 | 0.5 | 0.25 | 0.5 | 1.0 |
| Catalyst Amount | 0.4 | 0.25 | 0.1 | 0.1 | 0 | 0 | 0.25 | 0.25 | 0.25 | 0.25 | 0.25 | 0.25 | 0.4 | 0.25 |
| Stabilizer | A | A | A | A | A | A | A | A | A | A | A | A | A | A |
| Stabilizer Amount | 1.0 | 1.0 | 1.0 | 1.0 | 1.0 | 1.0 | 1.0 | 1.0 | 1.0 | 1.0 | 1.0 | 1.0 | 1.0 | 1.0 |
| Carbon Black amount | 27.0 | 27.0 | 27.0 | 27.0 | 27.0 | 27.0 | 27.0 | 27.0 | 27.0 | 27.0 | 27.0 | 27.0 | 27.0 | 27.0 |
| Results | | | | | | | | | | | | | | |
| Gen IV Cond 1 | CF | CF | CF | CF | AF | AF | | | | | | | CF | |
| Gen IV Cond 2 | CF | | CF | | | | | | | | | | CF | |
| DC Cond 1 | AF | CF | CF | AF | AF | AF | CF | CF | AF | CF | G | G | AF | CF |
| DC Cond 2 | AF | | CF | | | | 80AF | CF | AF | CF | | | AF | CF |
| UC Cond 1 | AF | AF | CF | AF | AF | AF | CF | CF | AF | CF | G | G | AF | CF |
| UC Cond 2 | AF | | CF | | | | CF | CF | AF | CF | | | AF | CF |
| 2K Cond 1 | CF | | | | | | | | | | | | CF | |
| 2K Cond 2 | CF | | | | | | | | | | | | CF | |

| Example | 32 | 33 | 34 | 35 | 36 | 37 | 38 | 39 | 40 | 41 | 42 | 43 | 44 | 45 |
|---|---|---|---|---|---|---|---|---|---|---|---|---|---|---|
| Polymer | C | C | C | C | C | C | C | C | C | C | C | C | C | C |
| Polymer Amount | 56.3 | 56.3 | 56.6 | 56.4 | 55.8 | 56.3 | 56.5 | 55.8 | 56.3 | 56.5 | 56.1 | 55.8 | 56.3 | 56.5 |
| Plasticizer | A | A | A | A | A | A | A | A | A | A | A | A | A | A |
| Plasticizer amount | 15.0 | 15.0 | 15.0 | 15.0 | 15.0 | | 15.0 | 15.0 | 15.0 | 15.0 | 15.0 | 15.0 | 15.0 | 15.0 |
| Adhesion promoter AP | D | D | D | D | E | E | E | F | F | F | G | G | G | G |
| AP amount | 0.5 | 0.5 | 0.25 | 0.5 | 1.0 | 0.25 | 0.25 | 1.0 | 0.5 | 0.25 | 0.5 | 1.0 | 0.5 | 0.25 |
| Catalyst Amount | 0.25 | 0.25 | 0.25 | 0.1 | 0.25 | 0.25 | 0.25 | 0.25 | 0.25 | 0.25 | 0.4 | 0.25 | 0.25 | 0.25 |
| Stabilizer | A | A | A | A | A | A | A | A | A | A | A | A | A | A |
| Stabilizer Amount | 1.0 | 1.0 | 1.0 | 1.0 | 1.0 | 1.0 | 1.0 | 1.0 | 1.0 | 1.0 | 1.0 | 1.0 | 1.0 | 1.0 |
| Carbon Black amount | 27.0 | 27.0 | 27.0 | 27.0 | 27.0 | 27.0 | 27 | 27 | 27 | 27 | 27 | 27 | 27 | 27 |
| Results | | | | | | | | | | | | | | |
| Gen IV Cond 1 | | CF | | CF | | | | | | | CF | | | |
| Gen IV Cond 2 | | | | | | | | | | | CF | | | |
| DC Cond 1 | AF | AF | AF | AF | CF | AF | G | 60CF | AF | AF | AF | AF | AF | AF |
| DC Cond 2 | CF | | AF | | CF | AF | | CF | AF | AF | AF | AF | AF | AF |
| UC Cond 1 | AF | AF | AF | AF | AF | AF | G | AF | AF | AF | AF | AF | AF | AF |
| UC Cond 2 | AF | | AF | | AF | AF | | AF | AF | AF | AF | AF | AF | AF |
| 2K Cond 1 | | | | | | | | | | | CF | | | |

TABLE 6-continued

| 2K Cond 2 | | | | | | | | | | CF | | |
|---|---|---|---|---|---|---|---|---|---|---|---|---|
| Example | 46 | 47 | 48 | 49 | 50 | 51 | 52 | 53 | 54 | 55 | 56 | 57 |
| Polymer | C | C | C | C | C | C | C | C | C | A | A | A |
| Polymer Amount | 55.8 | 56.3 | 56.5 | 55.6 | 55.6 | 55.6 | 55.8 | 56.3 | 56.5 | 46.8 | 46.3 | 46.3 |
| Plasticizer | A | A | A | A | A | A | A | A | A | B | B | B |
| Plasticizer amount | 15.0 | 15.0 | 15.0 | 15.0 | 15.0 | 15.0 | 15.0 | 15.0 | 15.0 | 21.3 | 21.0 | 21.0 |
| Adhesion promoter AP | C | C | C | I | I | I | J | J | J | | C | I |
| AP amount | 1.0 | 0.5 | 0.25 | 1.0 | 0.5 | 0.25 | 1.0 | 0.5 | 0.25 | 0 | 1.18 | 1.18 |
| Catalyst Amount | 0.25 | 0.25 | 0.25 | 0.25 | 0.25 | 0.25 | 0.25 | 0.25 | 0.25 | 0.46 | 0.46 | 0.46 |
| Stabilizer | A | A | A | A | A | A | A | A | A | B | B | B |
| Stabilizer Amount | 1.0 | 1.0 | 1.0 | 1.0 | 1.0 | 1.0 | 1.0 | 1.0 | 1.0 | 0.77 | 0.75 | 0.75 |
| Carbon Black amount | 27 | 27 | 27 | 27 | 27 | 27 | 27 | 27 | 27 | 30.7 | 30.7 | 30.7 |
| Results | | | | | | | | | | | | |
| Gen IV Cond 1 | | | | | | | | | | CF | CF | CF |
| Gen IV Cond 2 | | | | | | | | | | | | |
| DC Cond 1 | AF | AF | AF | AF | AF | AF | AF | AF | AF | AF | AF | CF |
| DC Cond2 | AF | AF | AF | AF | AF | AF | AF | AF | AF | | | |
| UC Cond 1 | AF | AF | AF | AF | AF | AF | AF | AF | AF | | | |
| UC Cond 2 | AF | AF | AF | AF | AF | AF | AF | AF | AF | | | |
| 2K Cond 1 | | | | | | | | | | AF | AF | AF |
| 2K Cond 2 | | | | | | | | | | | | |

G means gelled.

The tested paint systems present different levels of difficulty with respect to the ability of an adhesive to bond to the paints without using a primer. The difficulty level relative to bonding to the paints without the use of a primer are listed in the order of increasing difficulty to bond to, DuPont Gen IV paints, 2 part polyurethane paints, PPG Diamond Coat paint and BASF Ureclear paint.

Examples 18 to 57 show that adhesives containing aminopropylalkoxysilanes bond to more paint systems without requiring the use of a primer to prepare the surface than other known adhesion promoters. Adhesives containing other adhesion promoters do not reliably bond to Diamond Coat paint, Ureclear paint or 2 part polyurethane paints without a primer.

Example 18 shows that Adhesion Promoter H demonstrates adhesion to DuPont Gen IV paint and to 2 part polyurethane paint. Examples 22 and 23 show that an adhesive without organotin catalyst has no adhesion. Example 25 shows that Adhesion Promoter K, A-1110, 3-aminopropyltrimethoxysilane, bonds to unprimed PPG Diamond Coat® paint and unprimed DuPont's Uraclear® paint. Examples 24 to 26 show the impact of catalyst and adhesion promoter concentration on adhesion. Based on this data it is expected that an adhesive containing Adhesion Promoter K would bond to unprimed DuPont Gen IV paint and 2 part polyurethane coated substrates.

Example 27 shows that adhesives containing Adhesion Promoter L, A1100 3-aminopropyltriethoxysilane bonds to unprimed PPG Diamond Coat paint and to unprimed BASF Ureclear paint coated substrates. Based on this data it is expected that an adhesive containing Adhesion Promoter L would bond to DuPont Gen IV and 2 part polyurethane paint coated substrates. Example 30 shows that an adhesive containing Adhesion Promoter D, Y9492 bis (3-trimethoxysilylpropyl) amine bonds to DuPont Gen IV paint and 2 part polyurethane paint coated substrates. Example 31 shows that an adhesive containing Adhesion Promoter D bonds to BASF Ureclear paint and PPG Diamond Coat paint coated substrates.

Examples 6 to 48 and 55 show that an adhesive containing Adhesion Promoter H, 3-glycidyloxypropyl-trimethoxysilane, bonds to unprimed DuPont Gen IV paint. The adhesive does not bond to PPG Diamond Coat paint, BASF Ureclear and 2 part polyurethane paint coated substrates.

Examples 49 to 51 demonstrate that an adhesive containing adhesion Promoter I, Y5187, 3-isocyanatopropyltrimethoxysilane, does not bond to PPG Diamond Coat paint and to BASF Ureclear paint coated substrates. Example 57 shows a different adhesive composition using adhesion promoter I bonding to DuPont Gen IV paint and PPG Diamond Coat paint coated substrates but not to unprimed 2 part polyurethane paint coated substrates. Examples 52 to 54 demonstrate that Adhesion Promoter J does not bond to PPG Diamond Coat paint and BASF Ureclear coated substrates.

EXAMPLES 58 to 69

Two series of several adhesives were prepared and tested on three unprimed coated surfaces. One series used dimethoxy silyl polymers (Prepolymer A) formulated as described above using the formulations described below.

In a second series the polymer was a trimethoxy functional silane prepared as described in Example 2. The adhesive was formulated as described above using the components listed in Table 7 below.

TABLE 7

| IngredientsExample | 58 | 60 | 62 | 64 | 66 | 68 |
|---|---|---|---|---|---|---|
| Prepolymer A | 44.0 | 44.0 | 44.0 | 44.0 | 44.0 | 44.0 |
| Plasticizer B | 20.2 | 20.2 | 20.2 | 20.2 | 20.2 | 20.2 |
| Adhesion Promoter H | 1.14 | 1.14 | 1.14 | 1.14 | 1.14 | 1.14 |
| Adh Promoter J | 0.73 | 0.73 | 0.73 | 0.73 | 0.73d | 0.73 |
| Filler | 33.5 | 33.5 | 33.5 | 33.5 | 33.5 | 33.5 |
| SUL-11A | 0.45 | | | | | |
| T-1 | | 0.45 | | | | |
| UL-28 | | | 0.45 | | | |
| UL-29 | | | | 0.45 | | |
| U-220 | | | | | 0.45 | |
| T-12 | | | | | | 0.45 |
| Total | 100.00 | 100.0 | 100.0 | 100.0 | 100.0 | 100.0 |

TABLE 7-continued

| Ingredients/Example | 59 | 61 | 63 | 65 | 67 | 69 |
|---|---|---|---|---|---|---|
| Trimethoxysilane | 44.0 | 44.0 | 44.0 | 44.0 | 44.0 | 44.0 |
| Plasticizer B | 20.2 | 20.2 | 20.2 | 20.2 | 20.2 | 20.2 |
| Adhesion Promoter H | 1.14 | 1.14 | 1.14 | 1.14 | 1.14 | 1.14 |
| Adh Promoter J | 0.73 | 0.73 | 0.73 | 0.73 | 0.73d | 0.73 |
| Filler | 33.5 | 33.5 | 33.5 | 33.5 | 33.5 | 33.5 |
| SUL-11A | 0.45 | | | | | |
| T-1 | | 0.45 | | | | |
| UL-28 | | | 0.45 | | | |
| UL-29 | | | | 0.45 | | |
| U-220 | | | | | 0.45 | |
| T-12 | | | | | | 0.45 |
| Total | 100.00 | 100.0 | 100.0 | 100.0 | 100.0 | 100.0 |

The adhesive bond to Dupont Gen IV, coating a 2 part polyurethane coating (2K) and BASF Ureclear Coating were tested according to the Quick Knife Adhesion tests. Several tin catalysts were used in the series, Fomrez SU-11A catalyst, which is the reaction product of dibutyltin oxide and phthalate ester; Dabco T-1 dibutyltin diacetate; Fomrez UL1–28 dimethyltin dicarboxylate; (Catalyst B) Fomrez UL-29 dimethyltin dimercaptide, Dabco T-12 dibutyltin dilaurate (Catalyst C) and U-220 dibutyltin deacelylacetonate (Catalyst A). The results are compiled in Table 8.

TABLE 8

| Example | Functional Group | Catalyst | Results[1] |
|---|---|---|---|
| 58 | Dimethoxysilane | SU-11A | CF GenIV |
| 59 | Trimethoxysilane | SU-11A | CF GenIV, 2K |
| 60 | Dimethoxysilane | T-1 | Did not cure[2] |
| 61 | Trimethoxysilanes | T-1 | CF Gen IV, 2K |
| 62 | Dimethoxysilane | UL-28 | Did not cure[2] |
| 63 | Trimethoxysilane | UL-28 | CF GenIV, 2K |
| 64 | Dimethoxysilane | UL-29 | Did not cure |
| 65 | Trimethoxysilane | UL-29 | Did not cure |
| 66 | Dimethoxysilane | U-220 | CF GenIV, 2K, Ureclear |
| 67 | Trimethoxysilane | U-220 | CF GenIV, 2K, Ureclear |
| 68 | Dimethoxysilane | T-12 | Did not cure[2] |
| 69 | Trimethoxysilanes | T-12 | CFGenIV, 2K |

[1]CF means adhesive failure when bonded to the listed surface. If not listed the adhesive demonstrated adhesive failure on the surface tested.
[2]The adhesive did not cure.

EXAMPLES 70–120

Several adhesive formulations were prepared as described hereinbefore, using the components described in Table 9, prepolymer D is a dimethoxysilyl functional difunctional polypropyleneoxide based polyether having a molecular weight of about 20000 available from Kaneka. Prepolymer E is a trimethoxysilyl functional polyurethane prepolymer prepared from 4000 a Mw polypropylene oxide based polyether methyl diphenyl isocyanate and phenylaminopropyl trimethoxysilane, in the ratio of 2:3:2. The prepolymer was prepared according to Example 2. In the formulations prepared 15 parts of Plasticizer A, 1.0 part of stabilizer A (except for Examples 88, 89, 93 and 94 which used 0.5 parts of Stabilizer A and 0.8 parts of Tinurvin 213 substituted benzotriazole 13 percent in polyalkylene glycol) and 27 parts of CSX-316 carbon black filler. The total parts were 100 parts. The adhesives were applied to glass plates having three different ceramic frit coatings. Ceramic frit coating 1 is a bismuth zinc based enamel, gravity bend. Ceramic frit coating 2 is zinc based enamel. Ceramic frit coating 3 is a bismuth zinc enamel. Samples were exposed to various conditions before testing. In Condition 3 samples were exposed to 100° F. at 100 percent relative humidity for 14 days. In Condition 4 samples were exposed to 90° C. at 23 percent relative humidity for 14 days. In Condition 5 samples were immersed in water at 32° C. for 10 days. In Condition 6 samples were exposed for 2000 hours in a Weatherometer (WOM). In Condition 7 samples were exposed for 2500 hours in a WOM. The WOM was operated according to SAE J1895 conditions. The samples were exposed continuously to the following cycles; 89° C. at 5 percent RH for 3.8 hours and 95 percent RH for 1 hour. The samples exposed to the WOM were tested according to the Quick Knife Adhesion and Lap shear tests described above. The results are compiled in Table 9.

TABLE 9

| Prepolymer | 70 | 71 | 72 | 73 | 74 | 75 | 76 | 77 | 78 | 79 | 80 | 81 | 82 | 83 | 84 |
|---|---|---|---|---|---|---|---|---|---|---|---|---|---|---|---|
| Prepolymer parts | 56.1 | 56.4 | 56.6 | 56.5 | 56.8 | 55.8 | 56.3 | 56.5 | 55.8 | 56.3 | 56.5 | 55.8 | 56.3 | 56.5 | 55.75 |
| Adhesion Promoter | C | C | C | C | C | L | L | L | E | E | E | K | K | K | D |
| AP Amount | 0.5 | 0.5 | 0.25 | 0.5 | 0.25 | — | — | — | — | 0.5 | 0.25 | 1.0 | 0.5 | 0.25 | 0.25 |
| Cat | A | A | A | — | — | A | A | A | A | A | A | A | A | A | A |
| Cat Amount | 0.4 | 0.1 | 0.1 | — | — | 0.25 | 0.25 | 0.25 | 0.25 | 0.25 | 0.25 | 0.25 | 0.25 | 0.25 | 1.0 |
| Frit 1 | | | | | | | | | | | | | | | |
| Cond 1 | — | — | — | — | — | CF | gelled | gelled | AF | AF | gelled | CF | CF | CF | CF |
| Cond 3 | — | — | — | — | — | AF | — | — | AF | AF | — | 50AF | 40AF | CF | CF |
| Cond 4 | — | — | — | — | — | — | — | — | — | — | — | — | — | — | CF |
| Cond 5 | — | — | — | — | — | — | — | — | — | — | — | — | — | — | CF |
| Cond 6 | — | — | — | — | — | — | — | — | — | — | — | — | — | — | 351.3/100CF |
| Cond 7 | — | — | — | — | — | — | — | — | — | — | — | — | — | — | 440.5/100CF |
| Frit 2 | | | | | | | | | | | | | | | |
| Cond 1 | — | — | — | — | — | — | — | — | — | — | — | — | — | — | CF |
| Cond 3 | — | — | — | — | — | — | — | — | — | — | — | — | — | — | CF |
| Cond 4 | — | — | — | — | — | — | — | — | — | — | — | — | — | — | CF |
| Cond 5 | — | — | — | — | — | — | — | — | — | — | — | — | — | — | 30–40CF |
| Cond 6 | — | — | — | — | — | — | — | — | — | — | — | — | — | — | 550/100CF |
| Cond 7 | — | — | — | — | — | — | — | — | — | — | — | — | — | — | 330.6/100AF |

TABLE 9-continued

| Frit 3 | | | | | | | | | | | | | |
|---|---|---|---|---|---|---|---|---|---|---|---|---|---|
| Cond 1 | CF | CF | CF | AF | AF | — | — | — | — | — | — | — | CF |
| Cond 2 | CF/AF | AF | — | — | — | — | — | — | — | — | — | — | CF |
| Cond 4 | CF | CF | — | — | — | — | — | — | — | — | — | — | CF |
| Cond 5 | — | — | — | — | — | — | — | — | — | — | — | — | CF |
| Cond 6 | CF | AF | — | — | — | — | — | — | — | — | — | — | 466/100CF |
| Cond 7 | — | — | — | — | — | — | — | — | — | — | — | — | 210/100AF |

| Prepolymer | 85 | 86 | 87 | 88 | 89 | 90 | 91 | 92 | 93 | 94 | 95 | 96 |
|---|---|---|---|---|---|---|---|---|---|---|---|---|
| Prepolymer parts | 56.25 | 56.00 | 55.50 | 55.3 | 27.7 | 56.1 | 56.1 | 28.1 | 55.8 | 28.0 | 55.8 | 56.3 |
| Adhesion Promoter | D | D | D | D | A/D | D | D | D | A/D | D | D | D |
| AP Amount | 0.25 | 0.5 | 1.0 | 1.0 | 1.0 | 0.5 | 0.5 | 0.5 | 0.5 | 0.5 | 1.0 | 0.5 |
| Cat | A | A | A | A | A | A | A | A | A | A | A | A |
| Cat Amount | 0.5 | 0.5 | 0.5 | 0.4 | 0.4 | 0.4 | 0.4 | 0.4 | 0.4 | 0.4 | 0.25 | 0.25 |
| Frit 1 | | | | | | | | | | | | |
| Cond 1 | CF | CF | CF | CF | CF | — | — | — | — | — | CF | CF |
| Cond 3 | CF | CF | CF | CF | CF | — | — | — | — | — | CF | CF |
| Cond 4 | CF | CF | CF | CF | CF | — | — | — | — | — | CF | CF |
| Cond 5 | CF | CF | 95–100CF | CF | CF | — | — | — | — | — | CF | CF |
| Cond 6 | 436.6/100CF | 493.7/100CF | 443.4/100CF | AF | AF | — | — | — | AF | AF | 439.3/100CF | 457.9/100CF |
| Cond 7 | 455.9/33CF 67AF | 501.3/80CF2 0AF | 416.8/40CF 60AF | — | — | — | — | — | — | — | 476.0/100AF | 512.8/100A |
| Frit 2 | | | | | | | | | | | | |
| Cond 1 | CF | 95–100CF | CF | AF | AF | — | — | — | — | — | CF | CF |
| Cond 3 | CF | CF | CF | — | — | — | — | — | — | — | 90CF | CF |
| Cond 4 | CF | CF | CF | — | — | — | — | — | — | — | 95–100CF | CF |
| Cond 5 | CF | CF | CF | — | — | — | — | — | — | — | CF | CF |
| Cond 6 | 545/100CF | 497/100CF | 561/100CF | — | — | — | — | — | — | — | 418/100CF | 441/100CF |
| Cond 7 | 293.1/100AF | 596.2/100AF | 459/100AF | — | — | — | — | — | — | — | 289.5/100AF | 498.5/100AF |
| Frit 3 | | | | | | | | | | | | |
| Cond 1 | CF | 80–90CF | 95–100CF | — | — | CF | CF | CF | — | — | CF | 80–100CF |
| Cond 2 | CF | CF | CF | — | — | CF | CF | CF | — | — | CF | CF |
| Cond 4 | CF | CF | 80–100CF | — | — | CF | CF | CF | — | — | CF | CF |
| Cond 5 | CF | CF | 95CF | — | — | — | — | — | — | — | CF | AF |
| Cond 6 | 606.9/100CF | 461.8/33CF6 7AF | 482.4/77CF 23AF | — | — | — | — | — | — | — | 326.9/60C4 0AF | 404.4/67CF3 3AF |
| Cond 7 | 352.8/100AF | 379.1/100AF | 356.9/100AF | — | — | CF/AF | AF | CF | — | — | 253.5/100AF | 229.9/100AF |

| Prepolymer | 97 | 98 | 99 | 100 | 101 | 102 | 103 | 104 | 105 | 106 | 107 | 108 | 109 | 110 | 111 | 112 |
|---|---|---|---|---|---|---|---|---|---|---|---|---|---|---|---|---|
| Prepolymer parts | 56.3 | 56.6 | 56.4 | 55.8 | 56.3 | 56.5 | 55.6 | 56.1 | 55.8 | 56.3 | 56.5 | 55.8 | 56.3 | 56.5 | 55.6 | 55.6 |
| Adhesion Promoter | D | D | D | F | F | F | G | G | G | G | G | C | C | C | C | I |
| AP Amount | 0.5 | 0.25 | 0.5 | 1.0 | 0.5 | 0.25 | 1.0 | 0.5 | 1.0 | 0.5 | 0.25 | 1.0 | 0.5 | 0.25 | 1.0 | 0.5 |
| Cat | A | A | A | A | A | A | A | A | A | A | A | A | A | A | A | A |
| Cat Amount | 0.25 | 0.25 | 0.1 | 0.25 | 0.25 | 0.25 | 0.4 | 0.4 | 0.25 | 0.25 | 0.25 | 0.25 | 0.25 | 0.25 | 0.4 | 0.25 |
| Frit 1 | | | | | | | | | | | | | | | | |
| Cond 1 | — | CF | — | CF | 60CF | 80CF | — | — | AF | AF | AF | AF | AF | AF | — | 90CF |
| Cond 3 | — | CF | — | CF | CF | CF | — | — | AF | AF | AF | AF | AF | AF | — | CF |
| Cond 4 | — | CF | — | — | — | — | — | — | — | — | — | — | — | — | — | — |
| Cond 5 | — | CF | — | — | — | — | — | — | — | — | — | — | — | — | — | — |
| Cond 6 | — | 429.3/100CF | — | — | — | — | — | — | — | — | — | — | — | — | — | — |
| Cond 7 | — | 334.6/100AF | — | — | — | — | — | — | — | — | — | — | — | — | — | — |
| Frit 2 | | | | | | | | | | | | | | | | |
| Cond 1 | — | CF | — | — | — | — | — | — | — | — | — | — | — | — | — | — |
| Cond 3 | — | CF | — | — | — | — | — | — | — | — | — | — | — | — | — | — |
| Cond 4 | — | CF | — | — | — | — | — | — | — | — | — | — | — | — | — | — |
| Cond 5 | — | CF | — | — | — | — | — | — | — | — | — | — | — | — | — | — |
| Cond 6 | — | 500/100CF | — | — | — | — | — | — | — | — | — | — | — | — | — | — |
| Cond 7 | — | 214.7/100AF | — | — | — | — | — | — | — | — | — | — | — | — | — | — |
| Frit 3 | | | | | | | | | | | | | | | | |
| Cond 1 | — | CF | — | — | — | — | — | — | — | — | — | — | — | — | — | — |
| Cond 2 | — | 90–100CF | — | — | — | — | — | — | — | — | — | — | — | — | — | — |
| Cond 4 | — | CF | — | — | — | — | — | — | — | — | — | — | — | — | — | — |
| Cond 5 | — | AF/CF mix | — | — | — | — | — | — | — | — | — | — | — | — | — | — |
| Cond 6 | — | 494.4/100CF | — | — | — | — | — | — | — | — | — | — | — | — | — | — |
| Cond 7 | — | 323.2/100AF | — | — | — | — | — | — | — | — | — | — | — | — | — | — |

TABLE 9-continued

| Prepolymer | 113 | 114 | 115 | 116 | 117 | 118 | 119 | 120 |
|---|---|---|---|---|---|---|---|---|
| Prepolymer parts | 55.6 | 55.6 | 55.8 | 56.3 | 56.5 | 55.8 | 55.8 | 55.8 |
| Adhesion Promoter | C | C | B | B | B | D | D | D |
| AP Amount | 0.25 | 1.0 | 1.0 | 0.5 | 0.25 | 1.0 | 1.0 | 1.0 |
| Cat | A | A | A | A | A | A | C | B |
| Cat Amount | 0.25 | 0.25 | 0.25 | 0.25 | 0.25 | 0.25 | 0.25 | 0.25 |
| Frit 1 | | | | | | | | |
| Cond 1 | AF | AF | AF | AF | AF | CF | 20CF | AF |
| Cond 3 | AF | AF | AF | AF | AF | 10CF | AF | AF |
| Cond 4 | — | — | — | — | — | AF | AF | AF |
| Cond 5 | — | — | — | — | — | AF | AF | 40–50AF |
| Cond 6 | — | — | — | — | — | AF | AF | AF |
| Cond 7 | — | — | — | — | — | AF | AF | AF |
| Frit 2 | — | — | — | — | — | AF | AF | AF |
| Cond 1 | — | — | — | — | — | AF | AF | AF |
| Cond 3 | — | — | — | — | — | 50–60CF | 40–50CF | 40–50AF |
| Cond 4 | — | — | — | — | — | 10CF | AF | AF |
| Cond 5 | — | — | — | — | — | AF | AF | AF |
| Cond 6 | — | — | — | — | — | 70–80CF | AF | AF |

What is claimed is:

1. An adhesive composition comprising
   a) i) a trialkoxysilane functional polyether or polyurethane wherein the polyether or polyurethane has a weight average molecular weight of 6000 or greater and a dialkyltin carboxylate or dialkyltin alcoholate; or
   ii) a dialkoxysilane functional polyether or polyurethane and a dialkyltin alcoholate; and
   b) a secondary amino straight chain alkyl trialkoxysilane;
   wherein the dialkyltin carboxylate or dialkyltin alcoholate is present in an effective amount to facilitate bonding of the adhesive to a substrate of from about 0.1 to about 1.0 percent by weight based on the weight of the adhesive and the secondary amino straight chained alkyl trialkoxysilane is present in an amount which is effective to facilitate bonding of the adhesive to a substrate wherein the amount is from about 0.5 to about 1.2 percent by weight.

2. The composition according to claim 1 wherein the amino alkyl trialkoxysilane corresponds to the formula

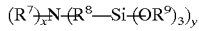

wherein
$R^7$ is independently in each occurrence a straight chain alkyl;
$R^8$ is independently in each occurrence a straight chain alkylene group;
$R^9$ is independently in each occurrence an alkyl group;
x is independently in each occurrence an integer of 0 or 1; and
y is an integer of 1 or 2;
wherein x+y is 2.

3. The adhesive of claim 2 wherein
$R^7$ is independently in each occurrence $C_{1-6}$ alkyl;
$R^8$ is independently in each occurrence $C_{1-6}$ alkylene; and
$R^9$ is independently in each occurrence $C_{1-6}$ alkyl.

4. The adhesive of claim 3 wherein
$R^7$ is independently in each occurrence $C_{1-3}$ alkyl;
$R^8$ is independently in each occurrence $C_{2-4}$ alkylene; and
$R^9$ is $C_{1-2}$ alkyl.

5. The adhesive of claim 3 wherein the
$R^8$ is propylene; and
$R^9$ is methyl.

6. The adhesive of claim 5 wherein
x is 0 and
y is 2.

7. The adhesive of claim 2 wherein the catalyst is a dialkyltin alcoholate.

8. The adhesive of claim 7 wherein the catalyst is present in an amount of from about 0.1 to about 0.5 percent by weight.

9. The adhesive of claim 8 wherein the catalyst is a dialkyltin bis acetylacetonate.

10. An adhesive composition comprising
    a) i) a trialkoxysilane functional polyether or polyurethane wherein the polyether or polyurethane backbone has a weight average molecular weight of 10,000 or greater and a dialkyltin carboxylate or dialkyltin alcoholate; or
    ii) a dialkoxysilane functional polyether or polyurethane and a dialkyltin alcoholate; and
    b) a primary or secondary amino straight chain alkyl trialkoxysilane;
    wherein the dialkyltin carboxylate or dialkyltin alcoholate is present in an effective amount to facilitate bonding of the adhesive to a substrate of from about 0.1 to about 1.0 percent by weight based on the weight of the adhesive and the primary or secondary amino straight chained alkyl trialkoxysilane is present in an amount which is effective to facilitate bonding of the adhesive to a substrate wherein the amount is from about 0.5 to about 1.2 percent by weight.

11. The composition according to claim 10 wherein the amino alkyl trialkoxysilane corresponds to the formula

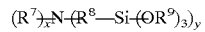

wherein
$R^7$ is independently in each occurrence a straight chain alkyl or aminoalkyl;
$R^8$ is independently in each occurrence a straight chain alkylene group;

$R^9$ is independently in each occurrence an alkyl group;

x is independently in each occurrence an integer of 0 or 1; and y is an integer of 1 or 2.

12. The adhesive of claim 11 wherein $R^7$ is independently in each occurrence $C_{1-6}$ alkyl or $C_{1-6}$ alkylamino;

$R^8$ is independently in each occurrence $C_{1-6}$ alkylene; and $R^9$ is independently in each occurrence $C_{1-6}$ alkyl.

13. The adhesive of claim 12 wherein $R^7$ is independently in each occurrence $C_{1-3}$ alkyl or $C_{1-3}$ alkylamino;

$R^8$ is independently in each occurrence $C_{2-4}$ alkylene; and $R^9$ is $C_{1-2}$ alkyl.

14. The adhesive of claim 12 wherein the $R^7$ is ethylamino;

$R^8$ is propylene; and $R^9$ is methyl.

15. The adhesive of claim 14 wherein x is 0 and y is 2.

16. The adhesive of claim 11 wherein the catalyst is a dialkyltin alcoholate.

17. The adhesive of claim 16 wherein the catalyst is present in an amount of from about 0.1 to about 0.5 percent by weight.

18. The adhesive of claim 17 wherein the catalyst is a dialkyltin bis acetylacetonate.

* * * * *